United States Patent [19]
Coward et al.

[11] Patent Number: 5,904,973
[45] Date of Patent: May 18, 1999

[54] MULTI-LAYER EXTENDED TEXT LABEL

[75] Inventors: Rod Coward; Andrew Whipp, both of Mississauga; Craig Surette, Unionville, all of Canada

[73] Assignee: Avery Dennison Corportion, Pasadena, Calif.

[21] Appl. No.: 08/824,256

[22] Filed: Mar. 26, 1997

Related U.S. Application Data

[63] Continuation of application No. 08/242,016, May 12, 1994, abandoned.

[30] Foreign Application Priority Data

Jan. 7, 1994 [CA] Canada .................................. 2113064

[51] Int. Cl.⁶ ................................ B32B 7/06; B41L 1/32
[52] U.S. Cl. ............................ 428/198; 283/81; 283/94; 283/101; 428/41.8; 428/42.1; 428/195; 428/201; 428/202; 428/914
[58] Field of Search ............................ 283/81, 94, 101; 428/40.1, 41.8, 42.1, 195, 201–204, 914, 198

[56] References Cited

U.S. PATENT DOCUMENTS

| 4,744,161 | 5/1988 | Instance .................................. 40/2 R |
| 4,768,810 | 9/1988 | Mertens .................................. 428/40 |
| 4,846,504 | 7/1989 | MacGregor .............................. 283/102 |
| 5,200,243 | 4/1993 | Van Veen ................................ 428/40 |
| 5,336,541 | 8/1994 | Kobayashi .............................. 428/40 |

FOREIGN PATENT DOCUMENTS

| 2090756 | 3/1992 | Canada .................................. 428/195 |
| 2103726 | 8/1992 | Canada .................................. 428/195 |
| 0043179 | 1/1982 | European Pat. Off. ............... 428/195 |
| 0304242 | 2/1989 | European Pat. Off. ............... 428/195 |
| 8604551 | 8/1986 | WIPO .................................... 428/195 |

*Primary Examiner*—Bruce H. Hess
*Attorney, Agent, or Firm*—Oppenheimer Wolff & Donnelly, LLP

[57] ABSTRACT

A label is disclosed which includes a first, base layer coated with a pressure sensitive adhesive for attachment to a selected product. A layer of release material is coated onto a portion of the base layer. A second layer is coated on a portion of its underside with a pressure sensitive adhesive for permanent attachment to the base layer in regions thereof that are not coated with release material, and temporary attachment to the base layer in regions thereof that are coated with release material.

27 Claims, 1 Drawing Sheet

MULTI-LAYER EXTENDED TEXT LABEL

This application is a continuation of U.S. patent application Ser. No. 08/242,016, filed May 12, 1994, now abandoned.

The present invention relates to the field of labelling. In particular, the present invention provides a multi-layered label useful for consumer products sold in bottles wherein it is desired to present to the consumer, on the bottle label, more information that will otherwise fit on the bottle label.

Many consumer products are sold in bottles, or other similar containers like cans or jars. Some of these products, such as insecticide or herbicides, require detailed instructions for use, and must carry product safety warnings. Moreover, in some countries, such as Canada, it is necessary to provide some information in leaflet form, attached to, or included with, a product. Such a leaflet will often be lost or damaged and, may on occasion, be inadvertently associated by an unwary consumer with the incorrect product.

The object of the present invention, in view of the foregoing, is to provide a label that is capable of presenting more information than ordinary one-ply labels. A further object of the present invention is to provide a multiple layer label. Yet a further object is to provide a multiple layer label that exhibits the neat appearance of a single layer label.

In a broad aspect, the present invention relates to a label, including, (i) a first, base layer coated with a pressure sensitive adhesive for attachment to a selected product; (ii) a layer of release material coating portion of said base layer; (iii) a second layer coated on a portion of its underside with a pressure sensitive adhesive for permanent attachment to said base layer in regions thereof that are not coated with release material, and temporary attachment to said base layer in regions thereof that are coated with release material.

In drawings that illustrate the present invention by way of example:

Figure 1:
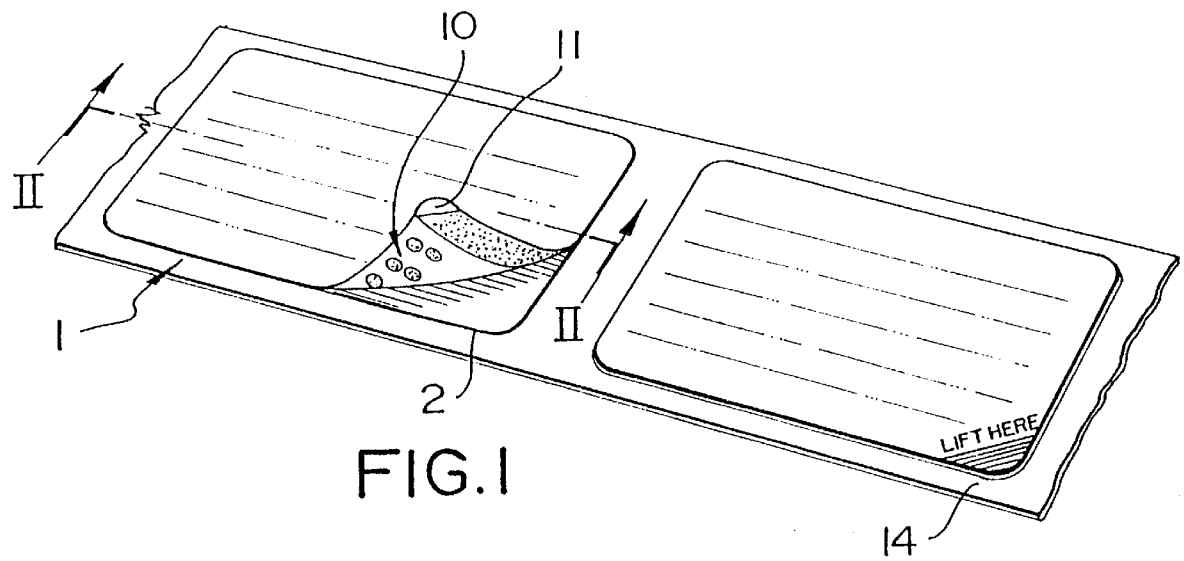
FIG. 1 is a perspective view of a label embodying the present invention.
Figure 2:
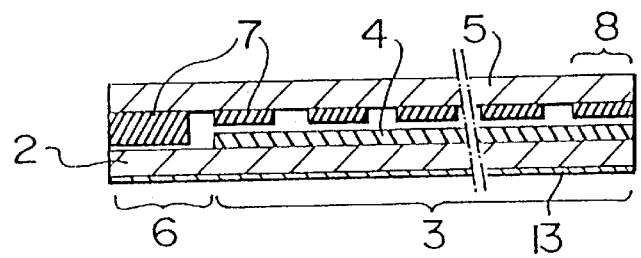
FIG. 2 is a cross-section through line II—II of FIG. 1, greatly enlarged in top-to-bottom dimensions.

Referring now to the drawings, the present invention provides a label 1 comprising a base layer 2 that may be made from paper, plastic or any other suitable label stock, as will be a matter of choice for one skilled in the art. A portion 3 of the base layer, which is preferably a majority of the surface thereof, is coated with a conventional release substance 4 that will permit easily releasable attachment of a pressure sensitive adhesive coated second layer 5 thereto. A margin 6 of the base layer, beside the portion 3 is not coated with the release substance, whereby pressure sensitive adhesive coated second layer 5 will bond permanently thereto.

The second layer 5, as has been alluded to above, is coated on a portion of its surface with a pressure sensitive adhesive 7. Adhesive 7 is applied over substantially the entire underside area of second layer 5 in contact with marginal area 6, which may be a small area, as illustrated, or may be larger, of base layer 2, to form a permanent bond to the paper or plastic substrate thereof. The remainder of the underside of second layer 5 is not fully coated with adhesive, to facilitate the peeling back thereof. That is, in a preferred embodiment, the edge 8 of the underside of layer 5 opposite margin 6 will be provided with a substantially uniform coating of adhesive, and the other edges 9 of the underside of layer 5 will be provided with a pattern 10 of adhesive. This preferred arrangement of adhesive will ensure that edge 8 remains fairly securely attached to base layer 2, until it is peeled back, while permitting the label to be peeled back with minimal effort once the edge 8 is peeled back. To further facilitate the peeling back of layer 5, a corner 11 of the layer in the area of edge 8 is preferably not coated with any adhesive, and appropriate instructional indicia are displayed on the face of layer 5 to show a consumer where to begin peeling back the layer 5 with relative ease.

Figure 3:
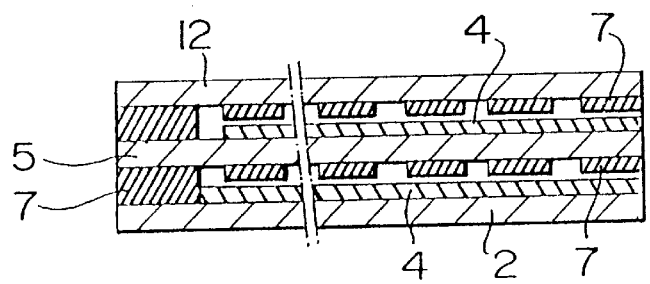
FIG. 3 is a second embodiment of a label according to the present invention, showing the same view as FIG. 2, and also in greatly enlarged scale.

Referring to FIG. 3, if desired a third (or other additional) layer 12 may be provided over second layer 5. If so, release substance, such as that applied to base layer 2 is applied to the face of second layer 5, and third layer 12 is coated on its underside with an overall pattern of adhesive similar to that of layer 5. However, the opposite corner of edge 8 on third layer 12 will preferably be left free of adhesive to permit the peeling back of third layer 12 without inadvertently peeling back layer 5 as well. Alternatively the same corner may be left free of adhesive, so that the layers may be manipulated like the pages of a leaflet, if desired.

It will be understood that rectangular labels are illustrated for exemplary purposes only. Any other shape may be utilized, with similar side to side (if not edge to edge) patterning of adhesive and release material.

It will also be understood that the underside of base layer 2 will be coated with pressure sensitive adhesive 13, and the entire label assembly mounted on a release sheet 14, as illustrated. Coating of the underside of the label is conventional, and may be a full coverage, or patterned coverage.

The second layer 5 may be raw paper or plastic. If paper, it may be glossy, matte or metallized; it is preferably preprinted, as is base layer 2, but it may be plain, in certain instances such as for use as a label for medical samples wherein it is desired that general information be written by the attending tester on the face of layer 5 and confidential information be written on base layer 2.

If layer 5 is plastic it may be polyester, polypropylene or polyethylene; white, clear or metallized; homopolymers or copolymers; cavitated or not cavitated, or any desired thickness or stiffness. The adhesive used on the underside of layer 5 is normally permanent, but if removable adhesive is desired, this may be used.

It is to be understood that the examples described above are not meant to limit the scope of the present invention. It is expected that numerous variants will be obvious to the person skilled in the field to which this invention pertains without any departure from the spirit of the invention. The appended claims, properly construed, form the only limitation upon the scope of the invention.

We claim:

1. A label including:
   I) a first, base layer coated with a pressure sensitive adhesive on one side for attachment to a selected product;
   ii) a layer of release material coating a portion of the other side of said base layer; and
   iii) a second layer coated on a portion of its underside with a pressure sensitive adhesive permanently attached to said base layer in at least one region thereof that is not coated with release material, and temporarily attached to said base layer in at least one region thereof that is coated with release material;
   wherein said second layer has at least one outer edge that is temporarily attached to said base layer such that a portion of said second layer is adapted to be lifted and peeled back from said base layer at said outer edge.

2. A label as described in claim 1, wherein said base layer is coated with release material over the entire surface of said other side of said base layer except for a margin thereof.

3. A label as described in claim 2, wherein said pressure sensitive adhesive is coated in an interrupted pattern on the underside of said second layer in the regions that are to be temporarily attached to said base layer.

4. A label as described in claim 3, wherein said label is substantially rectangular in configuration, and said margin comprises a side margin.

5. A label as described in claim 4, wherein at least the opposite side margin of the underside of said second layer is coated with adhesive.

6. A label as described in claim 5, wherein the upper and lower margins of the underside of said second layer are coated with an interrupted pattern of said adhesive.

7. A label as described in claim 1, wherein said second layer is paper.

8. A label as described in claim 1, wherein said second layer is plastic.

9. A label as described in claim 1 including one or more additional layers over said second layer.

10. A label, comprising:
   i) a first, base layer coated on a lower surface with a pressure sensitive adhesive for attachment to a selected product;
   ii) a layer of release material coating a portion of an upper surface of said base layer;
   iii) a second layer coated on a portion of its underside with a pressure sensitive adhesive permanently attachment to said base layer in regions thereof that are not coated with release material, and temporarily attached to said base layer in regions thereof that are coated with release material;
   said base layer being coated with release material over its entire upper surface except for a margin thereof.

11. A label as described in claim 10, wherein said pressure sensitive adhesive is coated in an interrupted pattern on the underside of said second layer in the regions that are to be temporarily attached to said base layer.

12. A label as described in claim 10, wherein said label is substantially rectangular in configuration, and said margin comprises a side margin.

13. A label as described in claim 12, wherein at least the opposite side margin of the underside of said second layer is coated with adhesive.

14. A label as described in claim 10, including one or more additional layers over said second layer, and applied thereto in a manner the same as the application of said second layer to said first layer.

15. A label system comprising:
   a release sheet;
   a plurality of labels mounted on said release sheet, each said label comprising:
   I) a first, base layer coated on a first surface with a pressure sensitive adhesive for attachment to a selected product;
   ii) a layer of release material coating the majority of a second surface of said base layer;
   iii) a second layer coated on a portion of its underside with a pressure sensitive adhesive permanently attached to said base layer in at least one region thereof that is not coated with release material, and temporarily attached to said base layer in at least one region thereof that is coated with release material, said second layer being adapted to be lifted from said temporarily attached region to reveal the majority of said second surface of said base layer.

16. A label system as described in claim 15, wherein said base layer on each label is coated with release material over its entire second surface except for a margin thereof.

17. A label system as described in claim 15, wherein said pressure sensitive adhesive is coated in an interrupted pattern on the underside of said second layer in the regions that are to be temporarily attached to said base layer on each label.

18. A label system as described in claim 16, wherein each said label is substantially rectangular in configuration, and said margin of each label comprises a side margin.

19. A label system as described in claim 18, wherein at least the opposite side margin of the underside of said second layer of each label is coated with adhesive.

20. A multiple layer label assembly comprising:
   a first, base layer having an upper surface and a lower surface, said lower surface being coated with a pressure sensitive adhesive for attachment to a selected product and said upper surface being printed with indicia;
   a layer of release material coating a portion of an upper surface of said base layer;
   a substantially opaque second layer having an upper surface and a lower surface, said lower surface being partially coated with a pressure sensitive adhesive, said second layer being permanently attached to said base layer in at least one region thereof that is not coated with release material and being temporarily attached to said base layer in at least one region thereof that is coated with release material;
   said pressure sensitive adhesive being coated in an interrupted pattern on the lower surface of said second layer in at least one area that is temporarily attached to said base layer and being coated with a substantially continuous coating in the region that is permanently attached to said base layer;
   said base layer being coated with release material over its entire upper surface except for an area at a margin thereof;
   wherein said opaque second layer covers said indicia on said base layer but is adapted to be lifted up in said area that is temporarily attached to said base layer to reveal said indicia on said base layer.

21. A multiple layer label assembly as defined in claim 20, wherein the upper surface of said second layer has indicia thereon.

22. A multiple layer label assembly as defined in claim 20 wherein at least one corner of said second sheet is free of adhesive, to facilitate convenient lifting of the corner from said base layer.

23. A multiple layer label assembly as defined in claim 20, further comprising a substantially opaque third layer that is permanently attached to a portion of said second layer and that is temporarily attached to another portion of said second layer, said upper surface of said second layer comprising indicia, wherein said substantially opaque third layer covers said indicia on said second layer but is adapted to be lifted up in said area that is temporarily attached to said second layer to reveal said indicia on said second layer.

24. A multiple layer label assembly as defined in claim 20, wherein said lower surface of said second layer is coated with a substantially continuous band of adhesive along an edge of the second layer in the region that is temporarily attached to said base layer, said edge also being temporarily attached to said base layer.

25. A multiple layer label assembly that provides multiple surfaces for displaying printing, thereby providing more surface area for printing than a single layer label assembly of comparable width and length, comprising:

a first, base layer coated with a pressure sensitive adhesive on its lower surface for attachment to a selected product;

a layer of release material coating a portion of the upper surface of said base layer, said upper surface having printing thereon;

a second layer that is coated on at least a portion of its underside with a pressure sensitive adhesive and that is permanently attached at one side edge thereof to said upper surface of said base layer in an area of said base layer that is not coated with release material, all of said second layer except for said one side edge thereof being temporarily attached to said upper surface of said base layer, which is coated with release material where said second layer is temporarily attached thereto;

said second layer having an upper surface with printing thereon; and said assembly thereby being constructed so that said second layer may be picked up at a corner thereof and folded back to said side edge to reveal the upper surface of said base layer, thereby permitting a user to view said printing on said upper surface of said base layer, said second layer being securely fastened to said base layer along said side edge.

26. A multiple layer label assembly as defined in claim 25, wherein said second layer is opaque, thereby blocking said printing on said base layer from view until said second layer is folded back from said base layer.

27. An assembly as defined in claim 26, wherein said adhesive on said second layer is coated in an interrupted pattern.

* * * * *